United States Patent [19]
Kasten

[11] 3,784,015
[45] Jan. 8, 1974

[54] FILTER
[75] Inventor: Walter Kasten, Franklin, Mich.
[73] Assignee: The Bendix Corporation, Southfield, Mich.
[22] Filed: Feb. 17, 1972
[21] Appl. No.: 227,642

Related U.S. Application Data
[63] Continuation of Ser. No. 24,778, April 1, 1970, abandoned.

[52] U.S. Cl.............................. 210/322, 210/488
[51] Int. Cl............................................ B01d 43/00
[58] Field of Search.................... 210/83, 84, 304, 210/322, 488, 512

[56] References Cited
UNITED STATES PATENTS

| | | | |
|---|---|---|---|
| 955,787 | 4/1910 | Freeman | 210/304 |
| 3,397,794 | 8/1968 | Toth et al. | 210/488 |
| 2,507,273 | 5/1950 | Schultz | 210/322 X |
| 3,543,931 | 12/1970 | Rastatter | 210/512 X |
| 3,648,843 | 3/1972 | Pearson | 210/488 X |

*Primary Examiner*—Frank A. Spear, Jr.
*Attorney*—William F. Thornton et al.

[57] ABSTRACT

A stacked washer multi-stage impaction and centrifugal separation filtering apparatus with a filter element composed of flat washers having a channel system formed thereon utilizing particle collection pockets to remove and store contaminants.

The purpose of the foregoing abstract is to enable the Patent Office and the public generally, and especially the scientists, engineers or practitioners in the art who are not familiar with patent or legal terms or phraseology, to determine quickly from a cursory inspection the nature and essence of the technical disclosure of the application. The abstract is neither intended to define the invention of the application, which is measured by claims, nor is it intended to be limiting as to the scope of the invention in any way.

7 Claims, 8 Drawing Figures

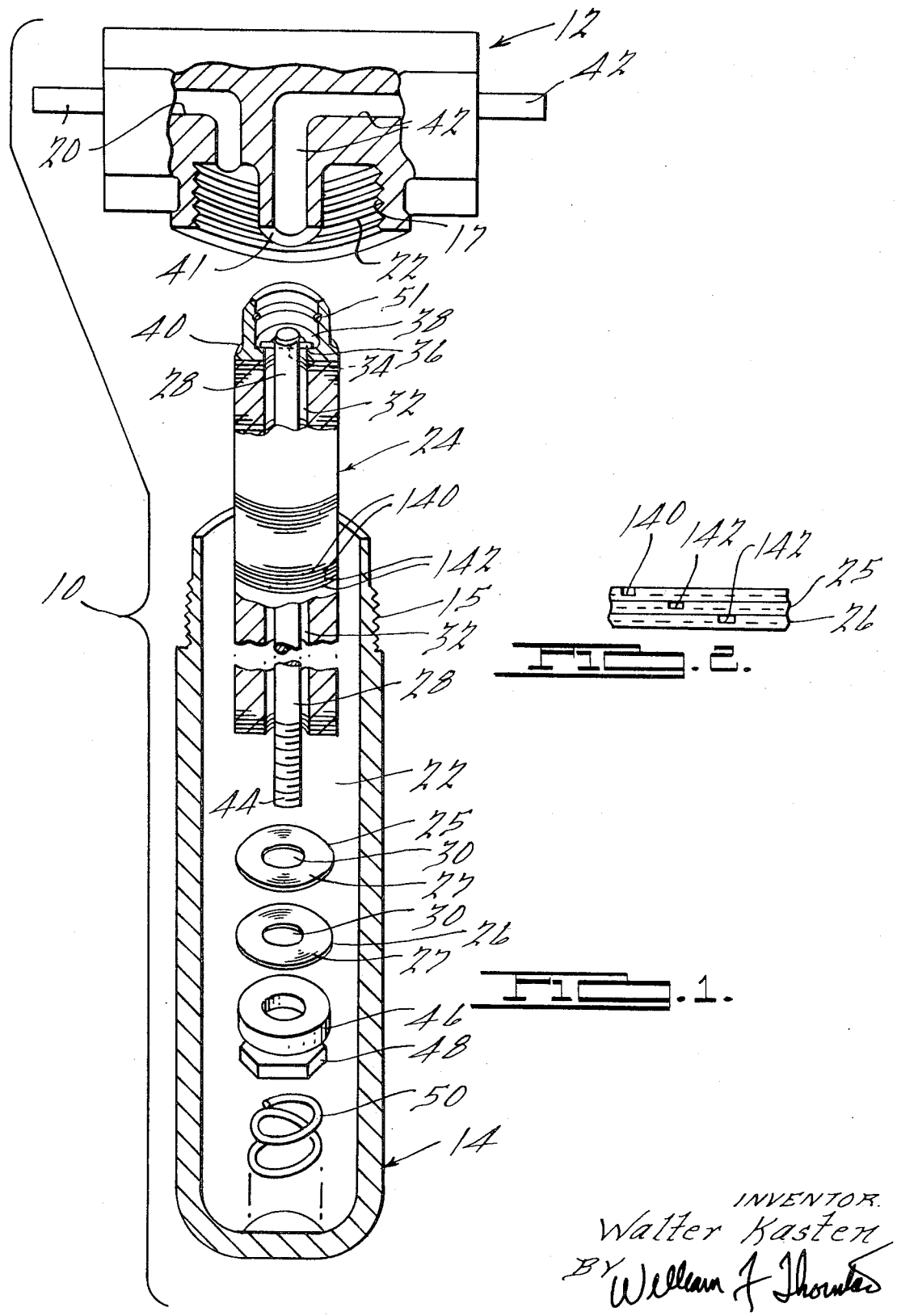

INVENTOR.
Walter Kasten
BY William F. Thants
ATTORNEY.

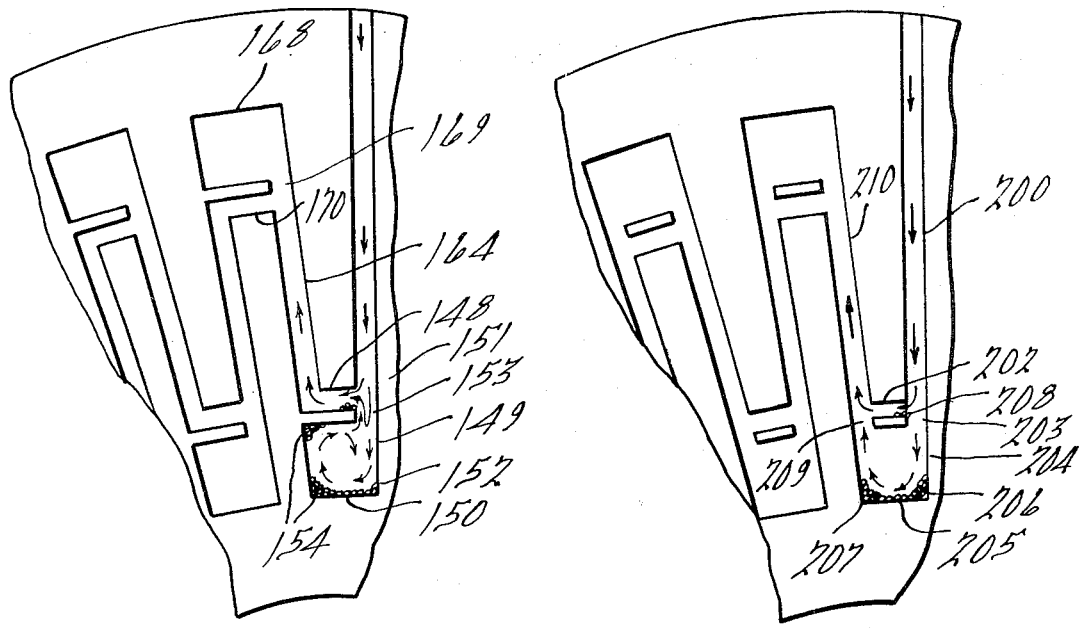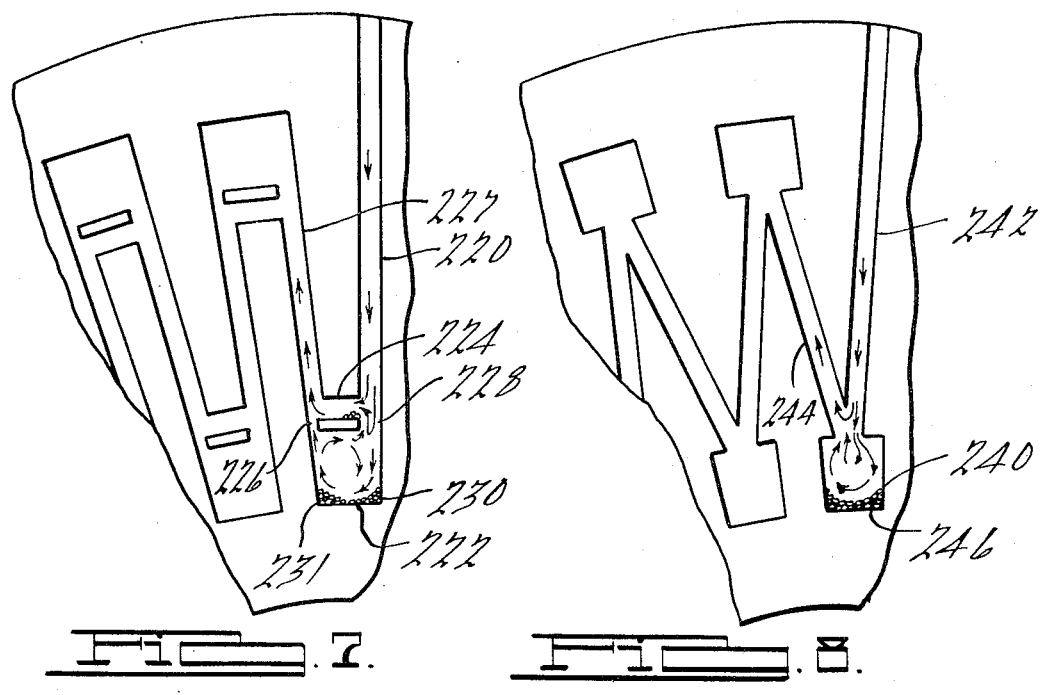

FILTER

This is a continuation of application Ser. No. 24,778, filed Apr. 1, 1970.

BACKGROUND OF THE INVENTION

Fluid filtering requirements continually become more stringent as levels of industrial pollution increase. In addition, modern fluidic and pneumatic devices require ever increasing levels of purity for dependable operation. To meet these increasingly rigorous requirements, filters must remove particles of ever decreasing size. A great need exists for improved filter devices for liquids and gases capable of removing extremely small particles such as those between 0.01 and 10 microns in diameter.

Particles are seldom perfectly spherical and thus do not really have "diameters". However, for the mathematical computations involved in most filter system planning, it is helpful to assume particles are spherical and do have diameters. When speaking of particle size, I shall henceforth presume that every particle can be assigned a diameter.

Few commercially available filters are effective when particles are smaller than 1 micron in diameter, and those that are effective are often large and cumbersome. Among the known filtration methods for removing particles smaller than 1 micron diameter are interception, electrostatic removal, diffusion, centrifugal separation, and impaction.

The interception filtration method removes particles by having them contact a post or other intercepting element in the flow stream and is effective in removing particles as small as 0.5 microns diameter provided the particle contacts the intercepting element. Unfortunately, the method functions effectively only when the diameter of the intercepting element is smaller than the diameters of the particles to be removed; since it is difficult to obtain intercepting elements smaller than 1 micron, the method is ineffective for removing particles as small as 0.01 microns diameter.

The electrostatic removal technique is unreliable since appreciable time is required for particles to acquire an adequate charge even when passing through a charging region because the magnitude of each charge is affected by a particle's size and dielectric properties. These problems greatly complicate electrostatic removal and for my purposes make it impractical.

Diffusion filtering is an effective method for removing particles of less than 0.1 microns diameter. Diffusion filtering efficiency increases as fluid velocity decreases. Unfortunately, it is generally difficult to make this velocity low enough to function effectively by itself.

Centrifugal separation devices presently available have been ineffective for removing particles much smaller than 10 microns in diameter. Effective centrifugal separation requires the generation of high centrifugal forces to cause contaminant particles to lodge against the outer edges of passages. Ordinarily, this centrifugal force is generated by swirling the fluid through a series of circular or spiral channels. Prior to my invention, it was virtually impossible to obtain the large centrifugal forces required to remove particles smaller than 10 microns in diameter. The invention disclosed herein utilizes a new apparatus which permits generation of the high centrifugal forces required to make centrifugal separation a practical filtration method for removing particles in the 0.01 to 10 micron diameter range.

Impaction filtering is an excellent method for removing particles ranging from 100 to 0.1 microns diameter. In the prior art, impaction filtering has been accomplished by cumbersome impact baffles and labyrinthine mazes which guide flowing fluid on collision courses with the impact baffles. This procedure is adequate when particle sizes are larger than 2.5 microns, but smaller particles often flow between baffles instead of colliding with them. The effectiveness of these prior art impaction filtering devices has always been reduced by turbulence occurring prior to the impaction. This turbulence decreases filtering efficiency because turbulent flow prior to impaction causes flowing fluid to retain and carry some contaminant particles around the impact surface rather than allowing them to collide with the surface. Such turbulence can be substantially eliminated by, prior to impaction, flowing the fluid along a channel of sufficient length to establish laminar flow. The present invention incorporates such channels to obtain laminar flow and thereby obtain higher efficiency from the impaction filtration process. Laminar flow also improves filtration efficiency when centrifugal separation is the filtration method employed. In order to remove particles of the size range 0.01 to 10 microns diameter, impaction and centrifugal separation are the most effective filtration methods.

Most prior art filters used for removal of 0.01 to 10 microns diameter particles had little dirt holding capacity. The narrow passages required for removal of extremely fine particles provided negligible space for storage of removed particles. As a result, particle accumulations frequently clogged the passages of such filters. My invention provides a new apparatus with greatly increased dirt holding capacity, thus providing longer life for the filter element. When saturation ultimately does occur, the unit can be easily disassembled, cleaned, and used again.

SUMMARY OF THE INVENTION

This invention comprises a filter for the removal of contaminant particles from flowing fluid. It can be adapted to remove a wide range of particle sizes, and can effectively remove particles as small as 0.01 microns. The term "particles" as used herein applies not only to solid contaminants, but also to droplets of liquid or mist.

The invention discloses a filter of new design which utilizes impaction and centrifugal filtration methods. The invention is embodied in an apparatus for removing extremely small particles of 0.01 through 10 microns diameter, but the invention, if desired, can be adapted to removing larger particles of any desired size.

Impaction and centrifugal separation are effective methods for removing particles from fluid if the particles collide with an impact surface. If particles collide, they attach themselves to the surface and are retained by adhesive forces between surface and particles. Both impaction and centrifugal separation become less efficient, however, if the fluid flow is turbulent. In turbulent flow velocities within the flow stream are random, and particles move in every direction. As a result, many particles have no velocity component directed toward the impact surface, and the random velocity of the fluid can often carry such particles around or by the surface without collision. This turbulence is a shortcoming of most prior art impaction and centrifugal separation filters.

Impaction and centrifugal filtration efficiencies are substantially improved by this invention's unique system of flow passages which are designed to diminish turbulence by establishing laminar flow prior to each impaction. Establishment of laminar flow causes an increased number of particles to collide with impact surfaces and thus be removed from the fluid. To establish laminar flow, the invention utilizes straight, smooth flow passages of ample length to eliminate the turbulence ordinarily occurring prior to impaction in prior art filters. It should be understood, however, that laminar flow, though helpful to my invention, is not essential to the invention's effective operation. The invention also has a system of connecting passages which permit establishment of a large number of filtration stages in a given space.

For purposes of this disclosure, the term "laminar flow" refers to flow in which there is little or no turbulence. In turbulent flow, the fluid velocity at any fixed point fluctuates with time in a nearly random way. In any physically realizable system, turbulence is never completely eliminated. Herein I describe as laminar any flow that is substantially free of turbulence.

Improved filtering is accomplished by guiding the fluid along a laminar flow passage to establish laminar flow, and then allowing this fluid to collide with impact surfaces which are positioned at the downstream end of the laminar flow passage in and adjacent to a particle collection pocket which will be further described hereinafter.

My filter has a plurality of particle collection pockets, one of which is associated with the downstream end of each laminar flow passage. Particles removed from the fluid lodge in these collection pockets and thus do not clog the other passages of my filter. These pockets greatly increase the dirt holding capacity of the filter element.

The filter element of my invention is composed of a plurality of thin annular filter washers which are stacked one on top of the other. An intricate channel system is formed on one surface of each washer, and the washers are then stacked on top of one another thereby causing the channel system side of one washer to be pressed against the flat unchanneled surface of an adjacent washer. Thus, the open channels of each washer are converted to closed passages which conduct fluid. The fluid passes from the outside of the washer stack to the central core of the stack. Variations are disclosed for the channel systems which are formed on the washers.

A channel system design is disclosed herein which incorporates what I call a "narrowed neck" principle. This will be described in greater detail hereafter, but in effect consists of a collection pocket having a first neck and a second neck, the second neck of which is of smaller cross section than the first neck and is thus narrowed. This design permits the creation of large centrifugal forces within the pocket and results in greater filtration efficiency and the removal of much smaller particles than prior art filters.

Washers can be fabricated of materials capable of withstanding high temperatures and pressures. When appropriate materials are selected, the filter can be used with temperatures as high as 1,000°C. Pressure differentials as high as 5,000 psi across the washer stack present no collapse problems. The invention can, if desired, be built to withstand even higher temperatures and pressures.

Still other advantages of the invention are that it is durable, compact, resistant to shock and rough handling, easy to manufacture, and simple to assemble.

BRIEF DESCRIPTION OF THE DRAWINGS

FIG. 1 is an exploded sectional view of a stacked washer fluid filter embodying my invention.

FIG. 2 is an enlarged edge view of three stacked washers like those used in the washer stack of FIG. 1 showing openings for fluid to enter the channel systems of the washer stack.

FIG. 4 is a further enlarged top view of a portion of the filter washer plate of FIG. 3.

FIG. 6 is an enlarged top view of a portion of a filter washer plate having another type of filter channel system embodying my invention.

FIG. 7 is an enlarged top view of a portion of a filter washer plate having still another type of filter channel system embodying my invention.

FIG. 8 is an enlarged top view of a filter washer plate having another variety of filter channel system embodying the invention.

DESCRIPTION AND OPERATION OF THE PREFERRED EMBODIMENTS

Figure 3:
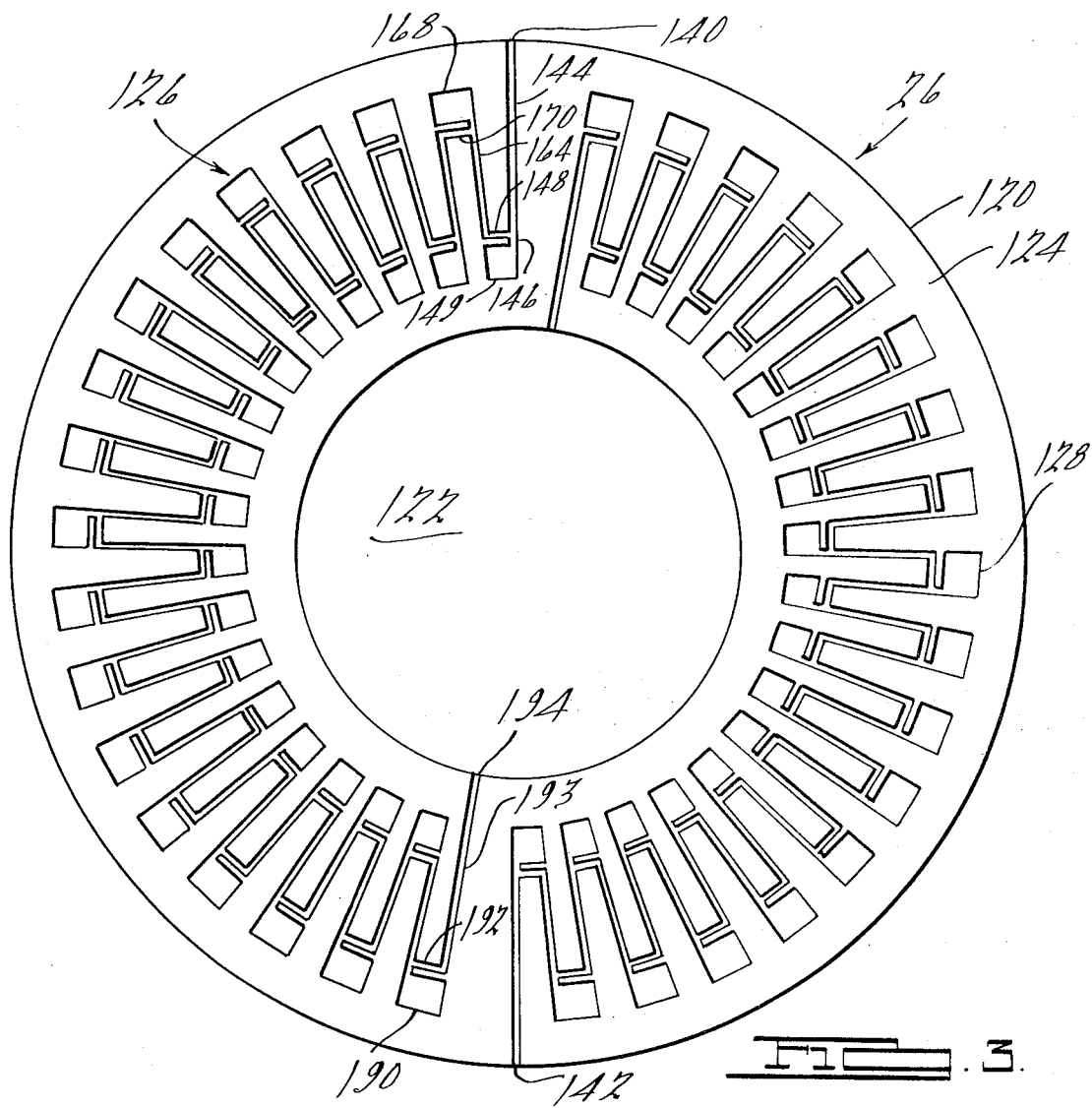
FIG. 3 is an enlarged top veiw of a filter washer plate having a novel filter channel system embodying my invention and usable in the filter assembly of FIG. 1.

The invention is shown in FIG. 1 embodied in a stacked washer fluid filter assembly indicated generally at 10. The filter assembly 10 has a head 12 and a casing 14. The casing 14 has casing threads 15 which cooperate with head threads 17 to attach the head 12 to the casing 14 and provide a fluid tight seal. An inlet passage 20 in the head guides incoming fluid to a reservoir 22; the reservoir occupies much of the interior of both the lower casing 14 and the head 12. A washer stack 24, formed of thin flat annular filter washers, such as washers 25 and 26, having a system of flow channels 27 thereon of the type shown in FIGS. 3–8, is positioned within the reservoir 22 (FIG. 1) and serves as the filter element. The many washers of washer stack 24 are aligned and centered about a rod 28 which is passed through the core 30 of each washer. The washer stack 24 may contain several thousand filter washers depending on the quantity of fluid to be filtered.

A hole 34 is bored diametrically through the upper end of the rod 28. Pin 36, which is passed through hole 34, cooperates with annular ridge 38 in upper collar 40 to hold the upper end of rod 28 to upper collar 40 when the washer stack 24 is fully assembled. The diameter of rod 28 is selected to permit ample clearance between it and washer stack core 32 so fluid can flow from washer stack core 32 through collar 40, and finally into outlet passage 42.

The lower end of rod 28 is provided with rod thread 44. When the individual washers are properly aligned about rod 28, a lower collar 46 is placed in communication with the lower face of the bottom washer 26 of the stack 24 and rod nut 48 is tightened securely onto rod thread 44 until the individual filter washers are securely compressed against one another. The lower collar 46 distributes the force evenly over the surface area of the lowest washer 26.

When the parts of filter assembly 10 are assembled and the casing 14 threaded into head 12, casing spring 50 keeps upper collar 40 of washer stack 24 in mating relationship with outlet tube 41. Upper collar 40 is provided with a gasket 51 to provide a fluid tight seal between the outlet tube 41 and upper collar 40.

FIG. 2 is an edge view of three filter washers stacked one on top of another. The washers may have channel systems consisting of any of the designs shown in FIGS. 3-8. The washer 26 (FIG. 2) is shown below and in contact with washer 25, permitting washer 25 to provide closure means for the channels of washer 26. The channels of washer 26 are thereby transformed into closed passages. The entrances 140 and 142 are clearly shown, and it should be noted that the orientation of individual washers is not a factor. The entrances 140 and 142 need not be aligned with other such openings or have any particular angular separation from other openings. This greatly eases assembly of the washers into a filter washer stack 24 (FIG. 1). In FIG. 1 the plurality of entrances 140 and 142 are shown randomly located about the outer periphery of washer stack 24.

Referring to FIG. 1, when the many filter washers such as washer 26 are fully assembled and aligned in washer stack 24 and the filter assembly 10 full assembled, pressurized fluid enters inlet passage 20 and flows into reservoir 22. From the reservoir 22, fluid enters the many small entrances such as 140, 142 in the filter stack 24 which are identical to those shown at 140 and 142, in FIG. 2. Fluid passes across the many filter washer plates by following the intricate channel system 27 thereon and ultimately reaches washer stack core 32 (FIG. 1). The fluid then flows along washer stack core 32 and passes through upper collar 40 and into outlet passage 42. The fluid has now been fully filtered.

FIG. 3 shows a filter washer 26, usable in the filter assembly 10 of FIG. 1, having an outer edge 120 and a central core 122. The circular cross section of the core 122 is made of an appropriate size to fit around the rod 28 of the filter assembly 10, (FIG. 1). The washer 26 shown in FIG. 3 has an intricate channel system formed on one side 124. A plurality of washers 26 are stacked one on top of the other to form a washer stack 24 (FIG. 1) such that the side 124 having the channel system formed thereon is pressed firmly against the opposite unchanneled side of an adjacent washer. Thus, the open channels on washer 26 are transformed into closed passages through which fluid can flow and be filtered.

The channel system washer 26 (FIG. 3) has two distinct networks; network 126 occupies approximately half of side 124 and network 128 occupies essentially the other half. Each network is operationally and structurally idential to the other, but each is independent of the other.

Fluid enters the channel networks 126 and 128 of washer 26 at entrances 140 and 142, respectively, each of which provide entrance means, and then flows toward the central core 122. Fluid enters the channel network 126 by entrance 140. I shall now explain the structure of network 126; to avoid duplication, network 128 will not be discussed in further detail. After passing through entrance 140 fluid flows along laminar flow channel 144. The channel 144 is of sufficient length to cause fluid reaching its downstream end 146 to have attained laminar flow characteristics. It is helpful if flow is laminar at the downstream end of each laminar flow channel because it improves filtration efficiency. Connecting channel 148 and particle collection pocket 149 are located adjacent the downstream end of channel 144. In essence, the network consists of a continuous serpentine channel having straight line portions in which laminar flow is established, collection pockets being located at the downstream ends of the straight line portions.

It should be understood that laminar flow channels improve the filtration efficiency of my invention, but are not essential to the effective operation of the invention. Thus, the channels designated herein as laminar flow channels or passages can be replaced by fluid flow channels or passages which because of the structure or geometry do not establish laminar flow, and my channel system invention will still function effectively.

A laminar flow channel, if used with my invention, should be essentially straight, smooth, and have a length to effective diameter ratio of at least 10 to 1. The term "effective diameter" refers to the diameter of a circle encompassing an area equal to the cross sectional area of the laminar flow channel 144. It has been found that length to effective diameter ratios between 20 and 30 provide excellent laminar flow results. In practice, the cross section of channel 144 and other like channels on the filter washer 26 are not perfectly round, and may, inter alia, be of square or rectangular cross section.

FIG. 4 is an enlarged view of the laminar flow channel 144 and pocket 149 shown in FIG. 3. In FIG. 4 the direction and pattern of fluid flow is indicated by flow arrows. When fluid flow reaches the intersection of laminar flow channel 144 with connecting channel 148 the fluid divides; some enters connecting channel 148 and the remainder enters collection pocket 149 at pocket neck 153 which is part of pocket 149. In pocket 149, the fluid undergoes a swirling motion (FIG. 4) which carries it through one or more circular movements before leaving the pocket 149 by pocket neck 153 and returning to connecting channel 148. Some fluid flow enters neck 153 and reverses its direction without penetrating further into the pocket. Such a flow reversal generates high centrifugal force and removes particles as small as 0.1 microns from the fluid. As fluid penetrates further into pocket 149, many of the contaminant particles in the fluid strike impact surface 150 and are retained there by adhesive force, known as van der Waal's force, between particles and wall. Contaminant particles are considerably more massive than fluid molecules, and hence, as the fluid enters pocket 149 and begins its circular or reversing movement, the contaminant particles with their greater mass cannot turn as easily as the fluid molecules and thus collide with the impact surface 150. An accumulation 152 of particles removed due to such impaction is shown on impact surface 150. As fluid continues its circular swirling motion, the centrifugal force imparted to contaminant particles in the fluid forces them outward against the walls of the pocket where they lodge and remain. Particle accumulations due to this centrifugal separation are shown at 154. Some filtration action also occurs at the intersection of laminar flow channel 144 with connecting channel 148. Particles too heavey to completely turn the corner from channel 144 into channel 148, but capable of partially entering channel 148 impact near the intersection and form a particle accumulation 151.

After completing one or more circular movements in the pocket 149, fluid flows back to connecting channel 148. It then follows channel 148 until it reaches laminar flow channel 164 which is part of the second filtration stage. It should be understood that the laminar flow channel 144, collection pocket 149, which includes neck 153, and connecting channel 148 represent the first filtration stage of the network 126 (FIG. 3) presently being described.

Fluid entering laminar flow channel 164 flows therealong, becoming laminar before reaching pocket 168 (FIGS. 3 and 4). As fluid in laminar flow channel 164 reaches connecting channel 170, the fluid again divides and some follows connecting channel 170 and the remainder enters collection pocket 168 by pocket neck 169 (FIGS. 3 and 4). In collection pocket 168, the same filtration process occurs again which has been described for collection pocket 149. Some impaction filtration again occurs at the intersection between laminar flow channel 164 and connecting channel 170. The fluid which entered collection pocket 168 ultimately leaves the pocket and follows connecting channel 170 until it enters the third filtration stage. Laminar flow channel 164, connecting channel 170, and pocket 168 with its neck 169 make up the second filtration stage.

Since the filtration process is identical for each of the filtration stages making up the network 126, it is unnecessary to explain in further detail the filtration process occurring in every one of the successive filtration stages. As the fluid leaves the collection pocket 190 of the final filtration stage of network 126 (FIG. 3), it enters connecting channel 192 which leads to channel 193 which terminates at exit 194. Channel 193 and exit 194 constitute exit means for network 126.

The structure and operation of network 128 is identical to that of network 126, and thus will not be described further. Although only two networks are shown on the filter washer 26, it should be understood that a single network or a number of networks greater than two, could with equal facility be formed on the filter washer 26. Although 34 filtration stages (FIG. 3) are shown in each network, the number of filtration stages per network can be increased or decreased depending on filtration requirements. The filter washer channel system of FIGS. 3 and 4 can effectively remove particles as small as 0.1 microns diameter.

In actual operation, a second filter washer must, of course, be pressed against the channel system side 124 of the filter washer 26 to serve as closure means and thus convert the open channels shown thereon into closed passages which can completely contain the fluid. Throughout this disclosure, I use the term "channel" to refer to an open flow path of the kind illustrated by laminar flow channel 144 in FIGS. 3 and 4. However, it should be understood that when closure means is applied to the open channels or when the channels are inside a body they become "passages".

The plurality of washer channel systems of the invention disclosed herein in FIGS. 3–8 can be formed on or in any plate and does not require an annular washer. A body, either unitary or with a plurality of parts, can contain the channel systems. Any plate seated against the channel system side of a filter plate can provide closure means for the channels thus forming a system of passages. If desired, a channel system can be formed on both sides of the filter washer plate 26 (FIG. 3). When assembled into a washer stack, a pair of such washers would be spaced from one another by a blank washer (not shown), i.e., without channels on either side.

Figure 5:
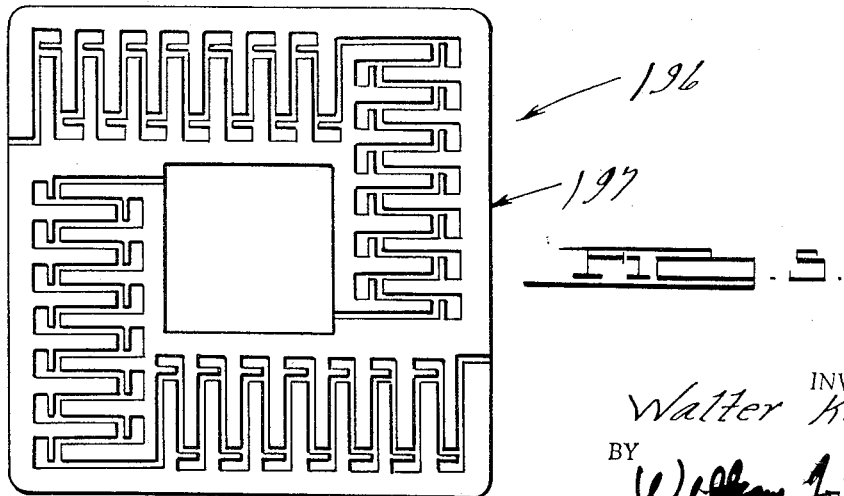
FIG. 5 is a top view of another type of filter washer plate.

FIG. 5 shows a filter washer 196 with a channel system similar to the one shown in FIG. 3. The filter washer of FIG. 5 is different from that of FIG. 3 in that it is formed on a square washer plate 197. In all other particulars, the channel system is identical to that in FIG. 3 except to the extent that the design had to be altered slightly to fit the shown square washer plate 197; the operation of each washer is identical. A square washer is more economical than a circular one because less material is wasted when they are stamped from material sheets. When square washers are made, the sheets are utilized more fully, and little waste results. In addition, a greater number of filtration stages can be formed on a square washer of a given width than on a round washer having a diameter equal to the given width.

In FIG. 6, I have shown an alternative design for my channel system in which channels lead directly into and out of the collection pocket 204. The channel design can be used to form a network or series of successive stages on a washer plate or in a body. It can be incorporated on either square, round, or other shaped washer plates and can, of course, be used in the filter assembly 10 of FIG. 1. The channel system of FIG. 6 is equally operational regardless of the direction of fluid flow.

In operation, fluid enters fluid flow channel 200 (which may be a laminar flow channel) (FIG. 6) and flows therealong as indicated by flow arrows until it reaches the intersection of channel 200 with connecting channel 202 and pocket 204. At that point, as in FIG. 4, the fluid divides, some following connecting channel 202 and the remainder entering collection pocket 204 by first pocket neck 203. In passing through the pocket 204, particles impact on the impact surfaces 205 of the pocket 204 and form particle accumulation 206. Centrifugal forces cause additional particles to lodge against the walls of the pocket forming particle accumulation 207. It should be noted that as in FIG. 4, some impaction filtration occurs at the intersection of connecting channel 202 with fluid flow channel 200, producing particle accumulation 208. After passing through the pocket 204 and leaving it by second neck 209, the fluid recombines at the point where connecting channel 202 joins fluid flow channel 210 of the next filtration stage. If the fluid flow direction were reversed opposite to the shown arrows, the filter structure of FIG. 6 would function equally well. It should be understood that although a limited number of filtration stages are shown in FIG. 6, additional stages can be incorporated. The channel system design shown in FIG. 6 can be used in a washer stack and can, if desired, be used in the filter assembly 10 of FIG. 1.

FIG. 7 is a modification of the channel system of FIG. 6 whereby second pocket neck 226 leading to the fluid flow channel 227 (which can be a laminar flow channel) of the successive stage is narrowed by making it of smaller effective diameter than first pocket neck 228. This modification can greatly improve the channel system's capability to remove extremely small particles from the fluid.

Fluid flows along fluid flow channel 220 (FIG. 7), which can be a laminar flow channel, and divides at the intersection with connecting channel 224; some fluid enters the pocket 222 through first pocket neck 228 and the remainder follows connecting channel 224. Some of the fluid entering by neck 228 reverses direction and leaves by neck 228; this rapid reversal generates high centrifugal forces and permits the removal of particles as small as 0.01 microns diameter. Some fluid follows the contour of the pocket wall to produce a swirling movement. Some of the fluid in pocket 222 escapes through the narrowed channel formed by second pocket neck 226 which is part of pocket 222 and extends to fluid flow channel 227 of the successive filtration stage. Pocket neck 226 is of a smaller effective diameter than fluid flow channel 220 or neck 228, and thus all the fluid entering pocket 222 cannot flow directly out of pocket 222 through the narrowed neck 226. As a result, the fluid in the pocket has the velocity of its circular swirling movement increased. Fluid entering the pocket at pocket neck 228 and fluid leaving the pocket at narrowed neck 226 add impetuous to this swirling movement. This channel design produces extremely high velocity circular movement within the collection pocket which results in centrifugal forces much higher than those achieved in prior art filters. With these higher centrifugal forces, much smaller particles can be removed from the fluid. Accumulations of removed particles are shown at 230 and 231. Because of the higher centrifugal forces generated, particles as small as 0.01 microns can be removed from the fluid. To achieve this result, the effective diameter of the narrowed neck should be less than that of the fluid flow channel 220; narrowed necks having effective diameters half those of the associated fluid flow channels have been found to function efficiently.

FIG. 8 shows another type of channel system usable on filter washers or in a filter body. In the channel system of FIG. 8, connecting channels are not used, and fluid flow channels of adjacent stages converge at a pocket.

Fluid flowing along fluid flow channel 242 reaches collection pocket 240 where some of the fluid enters the pocket and contaminant particles are removed by impaction and centrifugal separation. Some fluid flows directly into fluid flow channel 224; to reach channel 244 fluid must undergo a hairpin turn from channel 244. This turning movement generates high centrifugal forces and aids filtration even though such fluid does not enter the pocket. Contaminant particles in such bypassing fluid often enter the pocket due to the centrifugal forces generated by the hairpin turn and thus are removed from the fluid. An accumulation of removed particles is shown at 246. Fluid that does enter the pocket 240 is filtered and leaves the pocket to enter fluid flow channel 244 of the successive filtration stage. The channel system shown in FIG. 8 can efficiently remove particles as small as 0.1 microns. Fluid flow channels 242 and 244 can, of course, be laminar flow channels, but this is not essential to the invention.

Throughout this disclosure, I have frequently described my particle collection pockets as located at the downstream end of laminar flow channels. The use of such laminar flow channels improves the filtration efficiency of my invention. It should be understood, however, that my unique particle collection pocket invention as illustrated in FIGS. 3–8 is completely operational even though a laminar flow channel is not utilized. In other words, the channel which I have described as a laminar flow channel can be replaced by a fluid flow channel which because of its length or geometry may not establish laminar flow. Such a fluid flow channel could be used with my pockets and excellent filtration would still result Naturally, however, the finest filtration results will be obtained when fluid flow entering my pockets is laminar. It should be understood, however, that all that is required for effective filtration with my invention is a serpentine passage with my particle collection pockets located therealong.

Individual filter washers, regardless of the channel design embodied thereon, can be fabricated from a variety of different materials depending upon the application intended. Possible materials include plastic, glass, ceramics, or almost any metal or alloy thereof. Of the metal group, stainless steel or aluminum has been found to function well. If a high temperature application is planned, it is advisable to choose a material which has a relatively high melting point. Stainless steel filter washers can operate efficiently in temperatures as high as 1,000°C. Naturally, the other components making up the filter assembly 10 shown in FIG. 1 must be of material capable of withstanding the same high temperatures. The channel system can be formed in the filter washers in a variety of ways including etching or stamping.

It has been found that a stacked washer filter is an excellent filter for applications where large pressures are involved. The sturdy filter washer stack used with the invention can withstand pressures as high as 5,000 psi without danger of collapse. Naturally, the assembly 10 should have a compatible strength. The device is well adapted to be connected to standard factory air pressure supply sources which ordinarily are in the 80 to 100 psi range. Typically, a pressure drop of approximately 20 psi occurs across the washer stack when it is in operation.

Another advantage of this invention is that when it ultimately becomes saturated with particles, it is easily cleaned. To clean the individual filter washers, one disconnects the casing 14 from the head 12 (FIG. 1) and then withdraws the washer stack 24 from the casing 14. One then unthreads nut 48, and the individual washers can be removed from rod 44 for cleaning. Emersion in an appropriate cleaning solution, scrubbing, ultrasonic cleaning or other appropriate means will remove the accumulated surface particles on the filter washers. If the filter unit is used to purify gases at high temperatures, such as 1,000°C, the filter washers become so hot that solid organic particles lodged therein literally disintegrate. At this temperature solid organic particles are converted to a gaseous state. In effect, the filter washer stack 24, at such a temperature, becomes a self-cleaning oven.

When reassembling the washer stack 24, no orientation problems arise, aside from vertical alignment. The positioning of entrances to individual washer channel systems such as entrance 140 and 142 (FIGS. 1–3) along the outer periphery of the washer stack 24 requires absolutely no attention. This fact greatly diminishes the toil of reassembling the washer stack 24.

The size of individual washers can be varied according to need. It has been found that circular washers having an outer diameter of approximately 1.625 inches and an inner diameter of approximately 0.75 inches function well for most filter applications. Ordinarily, individual washers are quite thin, i.e., 0.005 inches thick, but this is variable depending on the application. Typically, individual channels have widths ranging between 0.004 and 0.010 inch, although this range is not compulsory. The depth of an individual channel is commonly about 0.0025 inches. In determining the width and depth dimensions of individual channels, it is helpful to first know the sizes of contaminant particles which are to be removed. The smallest channel dimension (either width or depth) should be at least 10 times the diameter of the largest expected particle. If channels are made smaller, the risk of channel clogging is greatly increased. If one expects occasional particles of diameter equal to or greater than 1/10 of the smallest channel dimension, it would be prudent to install a pre-filter to remove these large particles before sending the fluid through the channels of my filter invention.

The connecting channels used with my invention need not be of any particular length. The connecting channels serve only to conduct fluid from one point to another and play no role in establishing laminar flow.

In the embodiments shown herein, the width and depth of individual channels is constant throughout the filter washer. If desirable, it is possible to vary the width or depth of the individual channels from one stage of the washer to the next. For example, the first three stages of the filter washer shown in FIG. 3 could have channel widths of 0.010 inch and the remaining stages could have channel widths of 0.004 inch. With such variations, the more coarse particles would be removed by the first three stages and the finer materials by the final stages where the channels are of smaller width. It should be understood that a decrease in the width of a laminar flow channel permits a decrease in the length of the laminar flow channel without adversely affecting laminar flow. By such a decrease in width, a greater number of filtration stages can be placed in a given area. If desired, it is possible to use a washer stack consisting of a mixture of washers. The stack could contain washers of the type described in FIG. 3 and also washers of the type shown in FIG. 6. A single channel system design is not essential to the filter assembly 10 to obtain efficient filtration.

The number of required filtration stages per washer needed for a particular application is easily computed using the following relationship:

Number of required stages $= [\text{Log}_{10}(1-E_f)]/[\text{Log}_{10}(1-E_s)]$ where $E_f =$ the required efficiency of a filter having the required number of stages and $E_s =$ the efficiency of an individual filtration stage. Efficiency is the ratio of contaminant particles removed from the fluid during fitration to particles in the fluid prior to filtration.

While I have described several preferred embodiments of the present invention, it should be understood that various changes, adaptions, and modifications may be made therein without departing from the spirit of the invention and the scope of the appended claims.

I claim:

1. A fluid flow filter comprising:
    a filter body;
    at least one particle collection pocket in said filter body for collecting and retaining contaminant particles, said particle collection pocket being a substantially closed cavity having a geometric center; and
    a fluid flow passage for transmitting fluid through said body, said passage including a first segment for directing fluid into said particle collection pocket along a path displaced from said geometric center, and an angularly disposed connecting segment forming a continuation of said fluid flow passage, said connecting segment intersecting said first segment immediately prior to said particle collection pocket, whereby a first portion of said fluid is caused to make a substantial change in direction immediately prior to entering said pocket causing contaminant particles to be separated therefrom, said separated particles continue to flow with the remaining portion of the fluid along said first segment into said pocket wherein the fluid is caused to swirl depositing said contaminant particles therein.

2. The combination according to claim 1 wherein a plurality of said particle collection pockets are disposed along said fluid flow passage, and said fluid flow passage includes a plurality of said first segments for respectively directing fluid into said pockets.

3. The combination according to claim 2 wherein said body has a plurality of said fluid flow passages and a plurality of particle collection pockets are disposed along each of said fluid flow passages.

4. The combination according to claim 3 wherein said first segment is a laminar flow section of sufficient length to permit fluid flowing therealong to develop laminar flow characteristics.

5. The combination according to claim 3 wherein said fluid flow passage further includes a plurality of second segments for directing fluid from said particle collection pockets to said connecting segment, said second segments connecting to said connecting segment downstream from said first segments to increase the rate of swirling in said pocket.

6. The combination according to claim 5 wherein said second segments conducting fluid from said particle collection pockets are of smaller effective diameters than said first segments.

7. A fluid filter with a plurality of successive filtration stages for purifying fluid flow comprising:
    a filter body;
    a fluid flow passage for transmitting fluid through said body, said passage comprising a plurality of series connected laminar flow sections, said sections being of sufficient length to permit fluid and contaminant particles flowing therealong to develop laminar flow characteristics and concentrate the inertial forces of the fluid and contaminant particles in the direction of fluid flow, said passages having corners at the junctions of said series connected sections for substantially changing the direction of fluid flow in said passage and generating centrifugal forces; and
    a plurality of particle collection pockets, located proximate the apexes of said corners, for collecting and retaining contaminant particles, each of said pockets being a substantially closed cavity having an aperture for communicating said pocket with said fluid passage at the apexes of said corners whereby said inertial and centrifugal forces of the fluid and contaminant particles flowing around said corner divert a portion of the fluid and contaminant particles through said aperture into said pocket where said diverted fluid is caused to swirl and deposit said contaminant particles in said collection pocket.

* * * * *